US007053916B2

(12) United States Patent
Kobayashi et al.

(10) Patent No.: US 7,053,916 B2
(45) Date of Patent: May 30, 2006

(54) INFORMATION PRESENTATION APPARATUS AND INFORMATION PROCESSING METHOD THEREOF

(75) Inventors: Toshihiro Kobayashi, Kanagawa (JP); Masakazu Fujiki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 96 days.

(21) Appl. No.: 10/626,590

(22) Filed: Jul. 25, 2003

(65) Prior Publication Data

US 2004/0145594 A1 Jul. 29, 2004

(30) Foreign Application Priority Data

Jul. 31, 2002 (JP) .............................. 2002-223279

(51) Int. Cl.
*G09G 5/00* (2006.01)
(52) U.S. Cl. .................................................. 345/633
(58) Field of Classification Search ......... 345/629–639
See application file for complete search history.

(56) References Cited

U.S. PATENT DOCUMENTS

| 5,969,725 A | 10/1999 | Fujiki et al. ................. 345/433 |
| 6,057,856 A * | 5/2000 | Miyashita et al. .......... 345/633 |
| 6,259,396 B1* | 7/2001 | Pham et al. ................... 342/90 |
| 2002/0057280 A1 | 5/2002 | Anabuki et al. ............. 345/633 |
| 2002/0164066 A1* | 11/2002 | Matsumoto ................. 382/154 |

OTHER PUBLICATIONS

Thomas et al. "First Person Indoor/Outdoor Augmented Reality Application: ARQuake." Jan. 2002 Personal and Ubiquitous Computing, vol. 6 Issue 1 . pp. 75-87.*

Thomas et al. "AR Quake: An Outdoor/Indoor Augmented Reality First Person Application."☐☐Wearable Computers, 2000. The Fourth International Symposium on , Oct. 16-17, 2000 ☐☐pp.:139-146.*

Sierra Software. Tribes software Nov. 30, 1998. ☐☐http://www.sierra.com/product.do?gamePlatformId=286.*

Piekarski, W.; Gunther, B.; Thomas, B. "Integrating virtual and augmented realities in an outdoor application." Augmented Reality, 1999. (IWAR '99) Proceedings. 2nd IEEE and ACM International Workshop on , Oct. 20-21, 1999. pp.:45-54.☐☐.*

(Continued)

*Primary Examiner*—Michael Razavi
*Assistant Examiner*—Eric Woods
(74) *Attorney, Agent, or Firm*—Fitzpatrick, Cella, Harper & Scinto

(57) ABSTRACT

An information presentation apparatus comprises an input unit, a measurement unit to measure a user's viewpoint position and pose, a model data storage unit to store virtual world model data, real world model data, and data necessary to generate a virtual world image, an annotation data storage unit to store data added to real and virtual worlds and displayed, a generation unit to generate an image of the virtual world by using information in the measurement unit, the model data storage unit and the annotation data storage unit, a user viewpoint image input unit to capture a real-world image viewed from the user's viewpoint, and an image display unit to display an image obtained by synthesizing the image from the generation unit and the image from the user viewpoint image input unit or the image from the user viewpoint image input unit, on a user's image display.

2 Claims, 6 Drawing Sheets

OTHER PUBLICATIONS

Piekarski, W.; Thomas, B.H. "Tinmith-Metro: new outdoor techniques for creating city models with an augmented reality wearable computer." IEEE Wearable Computers, 2001. Proceedings. Fifth International Symposium on , Oct. 8-9, 2001. pp.:31-38□□.*

T. Jung, M. Gross, E. Do. "Annotating and Sketching on 3D Web Models". Apr. 2002 ACM CHI '02 extended abstracts on Human factors in computing systems.*

* cited by examiner

INFORMATION PRESENTATION APPARATUS AND INFORMATION PROCESSING METHOD THEREOF

BACKGROUND OF THE INVENTION

1. Field of the Invention

The present invention relates to an information presentation apparatus which presents an image obtained by synthesizing (or composing) a real world and a virtual world, and an image processing method of the information presentation apparatus.

2. Related Background Art

Recently, proposals have been made for an apparatus which would use and apply a mixed reality (MR) technique of naturally combining a real world and a virtual world with each other without uncomfortableness. Among them is an apparatus which superimposes virtual information on the real world and/or the virtual world observed by a user wearing a head mounted display (HMD), and presents the obtained information to the user is proposed, whereby it is expected in this apparatus to improve working properties concerning engineering work, maintenance and the like. For example, a method of supporting a surveying work by superposing virtual flags on the image of the real world and then displaying the obtained image on the user's HMD is proposed. However, many of these apparatuses are premised on being used by only one user, whereby it is difficult to say that these apparatuses are suitable for uses such as conferences, lectures, cooperation or the like that involves sharing a single mixed reality (MR) space with plural persons.

In other words, in a case where two or more persons are involved in a conference, lecture or the like by sharing the single MR space, it is necessary for these persons to observe the same target and thus share the information concerning the target in question.

SUMMARY OF THE INVENTION

An object of the present invention is to be able to provide predetermined information to users, by superposing an annotation on an image obtained by synthesizing a real world and a virtual world.

For example, the present invention aims to provide a means for transmitting a target that one user wishes to cause another user to pay attention, a means for knowing position and direction of a target that users should pay attention, or a means for knowing whether or not a target to which one user is paying attention at present is observed by another user.

In order to achieve the above object, one aspect of the present invention is an information presentation apparatus comprising:

a user operation input unit, adapted to input an operation of a user;

a user viewpoint position and pose measurement unit, adapted to measure a position and pose at a user's viewpoint;

a model data storage unit, adapted to store virtual world model data, real world model data, and data necessary to generate a virtual world image;

an annotation data storage unit, adapted to store data necessary to be added to a real world and a virtual world and then displayed;

a virtual image generation unit, adapted to generate an image of the virtual world by using information in the user viewpoint position and pose measurement unit, the model data storage unit and the annotation data storage unit;

a user viewpoint image input unit, adapted to capture an image of the real world viewed from the user's viewpoint; and an image display unit, adapted to display an image obtained by synthesizing the image generated by the virtual image generation unit and the image obtained by the user viewpoint image input unit, on an image display device of the user.

Moreover, to achieve the above object, another aspect of the present invention is an information processing method comprising the steps of:

inputting viewpoint information of a user;

generating a virtual world image according to the viewpoint information, by using previously held virtual world data;

generating an annotation concerning an attention target; and generating an image obtained by synthesizing an image of a real world, generated virtual world image and the generated annotation.

Moreover, to achieve the above object, the present invention is characterized by a program to achieve an information processing method comprising the steps of:

inputting viewpoint information of a user;

generating a virtual world image according to the viewpoint information, by using previously held virtual world data;

generating an annotation concerning an attention target; and generating an image obtained by synthesizing an image of a real world, generated virtual world image and the generated annotation.

Other objects and features of the present invention will become apparent from the following description taken in conjunction with the accompanying drawings.

DESCRIPTION OF THE PREFERRED EMBODIMENTS

Hereinafter, the preferred embodiments of the present invention will be described with reference to the accompanying drawings.

One Embodiment

Figure 1:
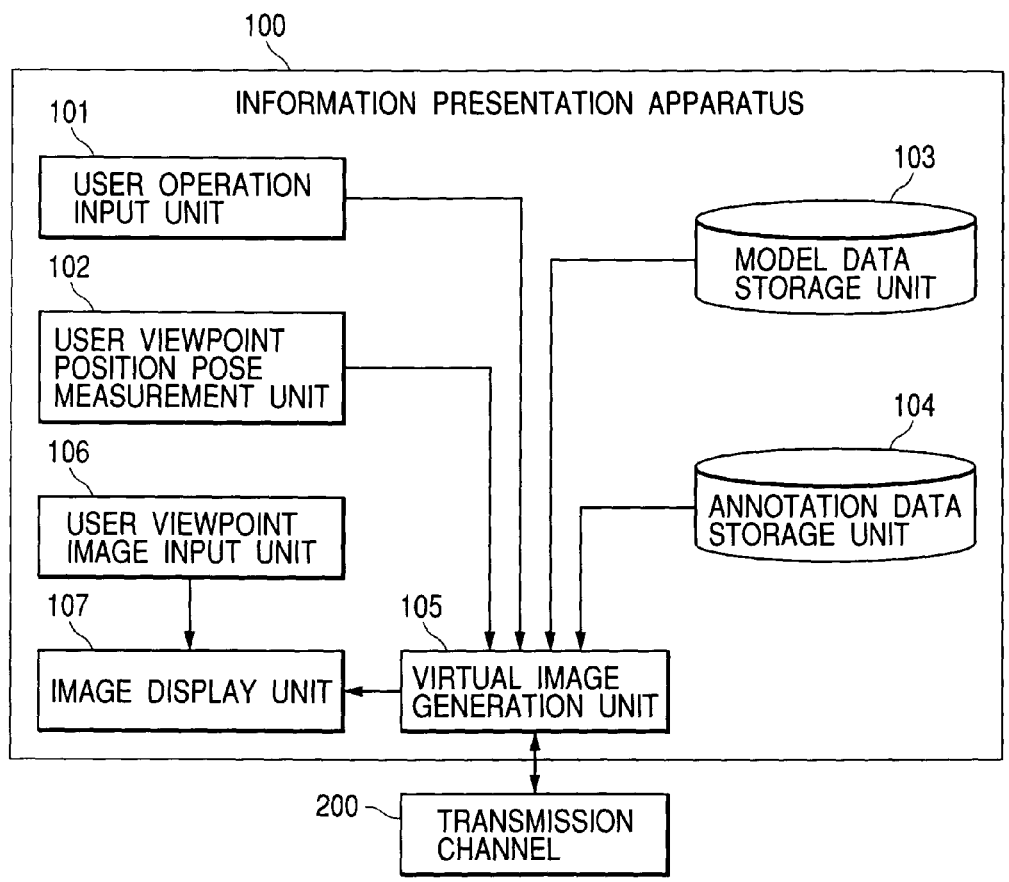
FIG. 1 is a block diagram schematically showing the structure of an information presentation apparatus according to one embodiment of the invention.

FIG. 1 is a block diagram schematically showing the overall structure in which an information presentation apparatus and an information presentation method according to this embodiment are applied.

A user operation input unit 101 is an input device which consists of, e.g., push button switches, a mouse, a joystick and the like. When a user of an information presentation apparatus 100 operates or handles the user operation input unit 101, control information according to operation(s) by the user is transferred to a virtual image generation unit 105.

A user viewpoint position and pose measurement unit 102 is a position and pose measurement device such as a magnetic sensor, an optical sensor or the like. The user viewpoint position and pose measurement unit 102 measures a position and pose at a user's viewpoint by six degrees of freedom and transfers a measured result to the virtual image generation unit 105. Since it is generally difficult to set the position and pose measurement device at the user's viewpoint, the user viewpoint position and pose measurement unit 102 has a function to calculate the position and pose at the user's viewpoint on the basis of the output result of the position and pose measurement device. For example, in a case where the position and pose measurement device is fixed to a user's head, a relation between the output of the position and pose measurement device and the position and pose at the user's viewpoint is always maintained constant, whereby the relation is expressed by a certain expression. Therefore, by obtaining the certain expression in advance, the position and pose at the user's viewpoint is calculated based on the output from the position and pose measurement device. In addition, it is possible to capture an image of a real world by using a user viewpoint image input unit 106, and thus perform image processing on the captured image to correct an error in the output result of the position pose measurement device. In this image processing, for example, positions of plural feature points of which the three-dimensional coordinates in a real space have been known are detected from the image, the detected positions are compared with the positions of feature points of the image calculated from the output result of the position and pose measurement device to calculate the error in the output result of the position pose measurement device, and the output result of the position and pose measurement device is corrected so as to delete the calculated error. Moreover, it is possible to calculate the position and pose at the user's viewpoint only from the image processing.

A model data storage unit 103 is an auxiliary storage device or medium such as a hard disk, a CD-ROM or the like. The model data storage unit 103 holds and stores virtual world model data necessary to draw a virtual world by computer graphics (CG), real world model data necessary accurately to synthesize the real world and the virtual world, and data necessary to generate a virtual world image. Here, the virtual world model data includes three-dimensional coordinates of vertices of a polygon of a virtual CG object arranged on the virtual world, structure information of faces of the polygon, discrimination information of the CG object, color information of the CG object, texture information of the CG object, size information of the CG object, position and pose information indicating the arrangement of the CG object in the virtual world, and the like. The real world model data includes three-dimensional coordinates of vertices of a polygon of an object existing in the real world merged with the virtual world, structure information of faces of the polygon, discrimination information of the object, size information of the object, position and pose information indicating the arrangement of the object, and the like. The data necessary to generate the virtual world image includes size and angle of an image pickup element of an image pickup device of the user viewpoint image input unit 106, and internal parameters such as an angle of view of a lens, a lens distortion parameter and the like. The information stored in the model data storage unit 103 is transferred to the virtual image generation unit 105. Here, the model data storage unit 103 is not limited to one provided inside the information presentation apparatus 100, that is, the model data storage unit 103 may be provided outside the information presentation apparatus 100 so as to transfer the data to the virtual image generation unit 105 through a transmission channel 200.

An annotation data storage unit 104 is an auxiliary storage device or medium such as a hard disk, a CD-ROM or the like. The annotation data storage unit 104 holds and stores annotation data which indicates additional information to be displayed on the real world and the virtual world. The annotation data includes position and pose information of the object in the real world and the virtual world, discrimination information of the object, and text, symbol and image information for indicating the object to a user. Here, the annotation data storage unit 104 is not limited to one provided inside the information presentation apparatus 100, that is, the annotation data storage unit 104 may be provided outside the information presentation apparatus 100 so as to transfer the data to the virtual image generation unit 105 through the transmission channel 200.

Figure 2:
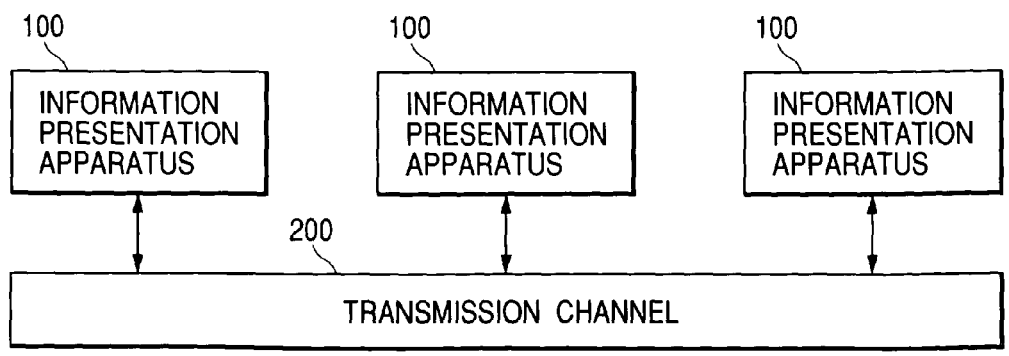
FIG. 2 is a block diagram showing the structure in a case where plural information presentation apparatuses are mutually connected together through a transmission channel, according to the embodiment of FIG. 1.

The virtual image generation unit 105 is actualized by a CPU, a microprocessor unit (MPU) or the like mounted in a computer. On the basis of position and pose information indicating the position and pose at the user's viewpoint obtained from the user viewpoint position and pose measurement unit 102, the virtual image generation unit 105 sets the user's viewpoint in the virtual world, draws the model data stored in the model data storage unit 103 by the CG from the set viewpoint, and thus generates the image of the virtual world viewed from the user's viewpoint. Moreover, as shown in FIG. 2, the virtual image generation unit 105 which has a function to transmit the data to the transmission channel 200 and receive the data from the transmission channel 200 is connected mutually to a virtual image generation unit 105 of another information presentation apparatus 100 through the transmission channel 200 so as to exchange necessary information between them. Thus, plural users use the respective information presentation apparatuses 100, whereby they can share the same (or identical) MR space. FIG. 2 is the block diagram showing the structure in the case where the plural information presentation apparatuses 100 mutually connected together through the transmission channel 200 are used by the plural users. In accordance with the position and pose at the user's viewpoint obtained from the user viewpoint position and pose measurement unit 102 and the position and pose of another user's viewpoint obtained through the transmission channel 200, the virtual image generation unit 105 generates an annotation to be presented to the user, on the basis of the annotation data stored in the annotation data storage unit 104. Then, the virtual image generation unit 105 superimposes the generated annotation on the image of the virtual world, and further displays the obtained image. Here, the generated annotation is not limited to a two-dimensional annotation. That is, the virtual image generation unit 105 may generate a three-dimensional annotation and draw the generated annotation by the CG together with the virtual world model stored in the model data storage unit 103. Incidentally, the virtual image generation unit 105 has a function to operate the virtual world and control the generated annotation according to user's operation information transferred from the user operation input unit 101.

The user viewpoint image input unit 106 which includes one or two image pickup devices such as a CCD camera or the like captures an image of the real world which greets the user's eyes and then transfers the captured image to an image display unit 107. Here, in a case where the image display unit 107 is equipped with an optical see-through HMD, the user can directly observe the real world, whereby the user viewpoint image input unit 106 is unnecessary in this case.

The image display unit 107 includes an image display device such as the HMD, a display or the like. The image display unit 107 synthesizes the image of the real world greeting the user's eyes and captured by the user viewpoint image input unit 106 and the image of the virtual world generated by the virtual image generation unit 105 together and then displays the synthesized image right in front of the user's eyes. Here, in the case where the image display unit 107 is equipped with the optical see-through HMD, the image of the virtual world generated by the virtual image generation unit 105 is displayed right in front of the user's eyes. Here, it should be noted that the image display unit 107 also acts as an image drawing unit according to an operation.

The transmission channel 200 is a medium which achieves a wired or wireless computer network. The plural information presentation apparatuses 100 are connected to the transmission channel 200, whereby the data to be mutually exchanged among the information presentation apparatuses 100 flows in the transmission channel 200.

Figure 3:
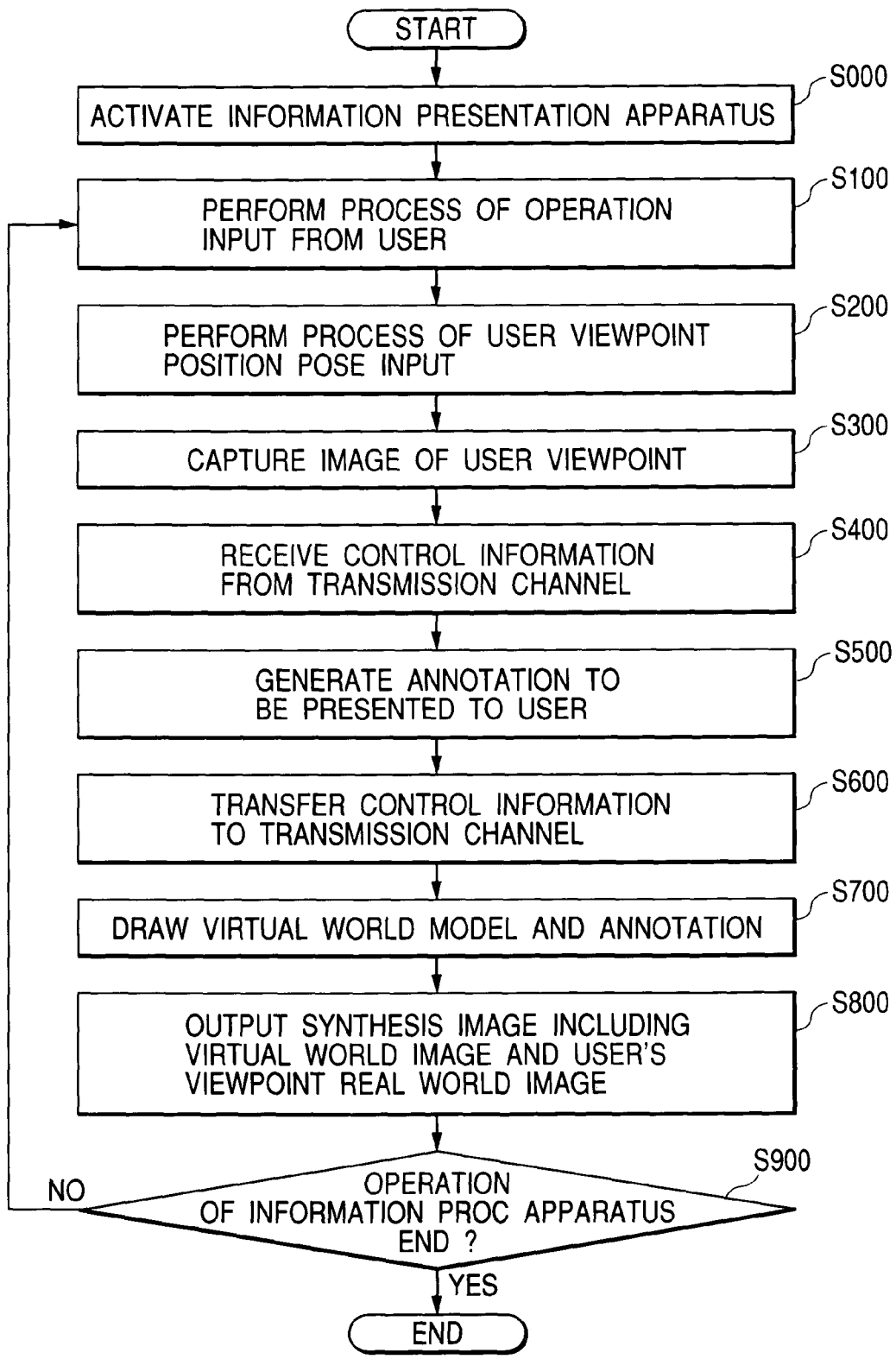
FIG. 3 is a flow chart for explaining a processing procedure in the information presentation apparatus.

Hereinafter, control of the embodiment in which the above structure is provided will be explained. FIG. 3 is a flow chart for explaining a process procedure in the information presentation apparatus according to the embodiment.

In a step S000, the information presentation apparatus is activated, and a process necessary for initialization is performed.

In a step S100, the user's operation with the user operation input unit 101 is recognized and converted into a control signal according to the operation content, and the obtained control signal is transferred to the virtual image generation unit 105.

In a step S200, the position and pose information indicating the position and pose at the user's viewpoint is measured by the user viewpoint position and pose measurement unit 102, and the obtained information is transferred to the virtual image generation unit 105.

In a step S300, the image of the real world viewed from the user's viewpoint is captured by the user viewpoint image input unit 106, and the captured image is then transferred to the image display unit 107. Here, in the case where the image display unit 107 is equipped with the optical see-through HMD as the display, the user can directly observe the real world, whereby the processing in the step S200 is unnecessary.

In a step S400, communication data is received by the virtual image generation unit 105 through the transmission channel 200. For example, the communication data includes identification number information of each user using the information presentation apparatus 100, name information capable of discriminating each user, position and pose information of each user's viewpoint, operation information of each user, the annotation data and the like.

In a step S500, the annotation to be presented to the user is determined by the virtual image generation unit 105 on the basis of the user's operation information obtained in the step S100, the position and pose information at the user's viewpoint obtained in the step S200, and the information concerning other user obtained in the step S400.

In the step S500, when a target in the real world or the virtual world that one user pays attention is notified to other users so that the other users pay attention to it, the plural users resultingly share the information in the MR space, whereby it is very useful for the plural users to perform working in which conference, lecture, cooperation or the like is necessary. Hereinafter, a means to achieve such an effect will be explained.

First, the data concerning the target that the user pays attention at present is retrieved and selected from the information of the objects in the real world and the virtual world stored in the annotation data storage unit 104. Incidentally, the target that the user pays attention may be automatically recognized and selected by the information presentation apparatus 100 or manually selected according to the user's operation on the user operation input unit 101.

In the method of automatically recognizing the target that the user pays attention, it is thought to use the position and pose information indicating the position and pose at the user's viewpoint obtained in the step S200 and the internal parameters of the image pickup device held in the model data storage unit 103.

Incidentally, in the step S500, all candidates of the targets existing inside the user's visual range are captured from the annotation data storage unit 104 on the basis of the internal parameters of the image pickup device and the position and pose information indicating the position and pose at the user's viewpoint. Then, in regard to the captures candidate, a Euclidean distance between a user's visual line and a point representative of the target is calculated, and the candidate for which the Euclidean distance is minimum can be considered as an attention target.

In case of judging whether or not one target is within the user's visual range, for example, it is thought to do so by the calculation from the position and pose information indicating the position and pose at the user's viewpoint obtained from the user viewpoint position and pose measurement unit 102 and the internal parameters of the image pickup device provided in the user viewpoint image input unit 106. That is, the target is projected on an image screen from the position and pose at the user's viewpoint by using the internal parameters of the image pickup device. Then, when the coordinates of the target projected on the image screen exist within a certain range defined by the size of the image, it is judged that the target in question is within the user's visual range.

It is assumed that a matrix created from the internal parameters of the image pickup device is given as follows.

$$K = \begin{matrix} \alpha_u & -\alpha_u \cot\theta & u_0 \\ 0 & \alpha_v/\sin\theta & v_0 \\ 0 & 0 & 1 \end{matrix}$$

where each of the symbols $\alpha_u$ and $\alpha_v$ indicates a pixel size of the image pickup device, the symbol $\theta$ indicates an angle between the longitudinal and lateral axes of the image pickup element, and the symbols $u_0$ and $v_0$ indicate coordinates of the pixel center. Moreover, it is assumed that a matrix created from the position and pose at the user's viewpoint is P=(Rt), where the symbol R indicates a rotation matrix of three rows and three columns representing the pose at the user's viewpoint, and the symbol t indicates a three-dimensional vector of the position of the user's viewpoint. Besides, it is assumed that the three-dimensional coordinates of the target are given as $x=(X, Y, Z, 1)^T$ by using the expression of the homogeneous coordinates, and the coordinates of the point of the target projected on the image screen are given as $u=(u, v, w)^T$ by using the expression of the homogeneous coordinates.

The coordinates u of the point of the target projected on the image screen can be obtained by calculation of $u=KP^{-1}x$. Then, when it is assumed that the range of the image in the u-axis direction is $[u_{min}, u_{max}]$ and the range of the image in the v-axis direction is $[v_{min}, v_{max}]$, if $u_{min} \leq u \leq u_{max}$ and $v_{min} \leq v \leq v_{max}$ are satisfied, it can be known that the target in question is within the user's visual range.

To calculate a distance between a straight line obtained from the position and pose at the user's viewpoint and the point representative of the target, it is thought to obtain the vector which passes the point representative of the target and crosses the user's visual line and then calculate the minimum value of the length of the vector in question.

The user's visual line is expressed as v=t+kp, where the symbol t indicates the three-dimensional vector of the position of the user's viewpoint, the symbol p indicates a three-dimensional vector of the pose at the user's viewpoint, and the symbol k is a real number other than "0."

Moreover, the point representative of the target is expressed by a three-dimensional vector b. Then, when it is assumed that the point where the vector passing the three-dimensional vector b and orthogonal to the visual line crosses the visual line is given as t+mp, the value m which minimizes the distance between the point t+mp and the three-dimensional vector b may be obtained. That is, $\|t+mp-b\|$ is the distance between the visual line and the point representative of the target.

When this distance is calculated, $\|t-b+(p\cdot(b-t)/\|b\|^2)p\|$ is obtained.

Incidentally, as a method of selecting the target that the user pays attention by handling and operating the input device of the user operation input unit 101, it is thought that the watching user operates the input device by using the mouse or the joystick as watching the synthesized image displayed on the image display unit 107. For example, the user handles and moves the mouse to the position where the attention target is being displayed, and then depresses the button of the mouse at that position, thereby selecting the desired target. Then, when the cursor handled by the user reaches the position where the object stored in the annotation data storage unit 104 is being displayed, the user can confirm whether or not the data concerning the object is being stored in the annotation data storage unit 104 by generating the annotation concerning the object.

An identification number of the target that the user pays attention is transferred to the transmission channel 200 in a step S600. At the same time, a user identification number and the position and pose information are also transferred to the transmission channel 200. Moreover, in the step S400, the identification number information of the target to which another user is paying attention, the user's identification number and the position and pose information are received from the transmission channel 200.

In the virtual image generation unit 105 of the information presentation apparatus 100 which is used by one user (called a watched user hereinafter), when it is judged that the target that another user (called a watching user hereinafter) pays attention is outside the visual range of the watched user, the annotation indicating the direction of the target is generated. This annotation includes symbols, characters, images and the like. To enable to easily recognize the target that which watching user is paying attention, it is possible to generate an annotation of which the attributes such as a color, a shape, a character type and the like have been changed in regard to each watching user, or an annotation which indicates a name capable of discriminating the watching user. Thus, when the watched user turns toward the direction indicated by the annotation, he can watch the target that the watching user is observing.

When the target that the watching user is paying attention is inside the visual range of the watched user, the annotation indicating the information of the target in question is generated. At that time, the attributes of the generated annotation such as the color, the shape, the character type and the like are made different from those of other annotation so as to make the generated annotation remarkable.

Moreover, when the watched user uses the input device of the user operation input unit 101, he or she can control the target of the generated annotation. For example, it is possible to select the specific watching user and then generate only the annotation concerning the target that the selected specific watching user pays attention. On the contrary, it is possible to generate the annotation concerning the target to which all the watching users are paying attention. In this case, such a selection is performed not only by the watched user's operation with use of the input device but also by the previous input before step S000.

Figure 4:
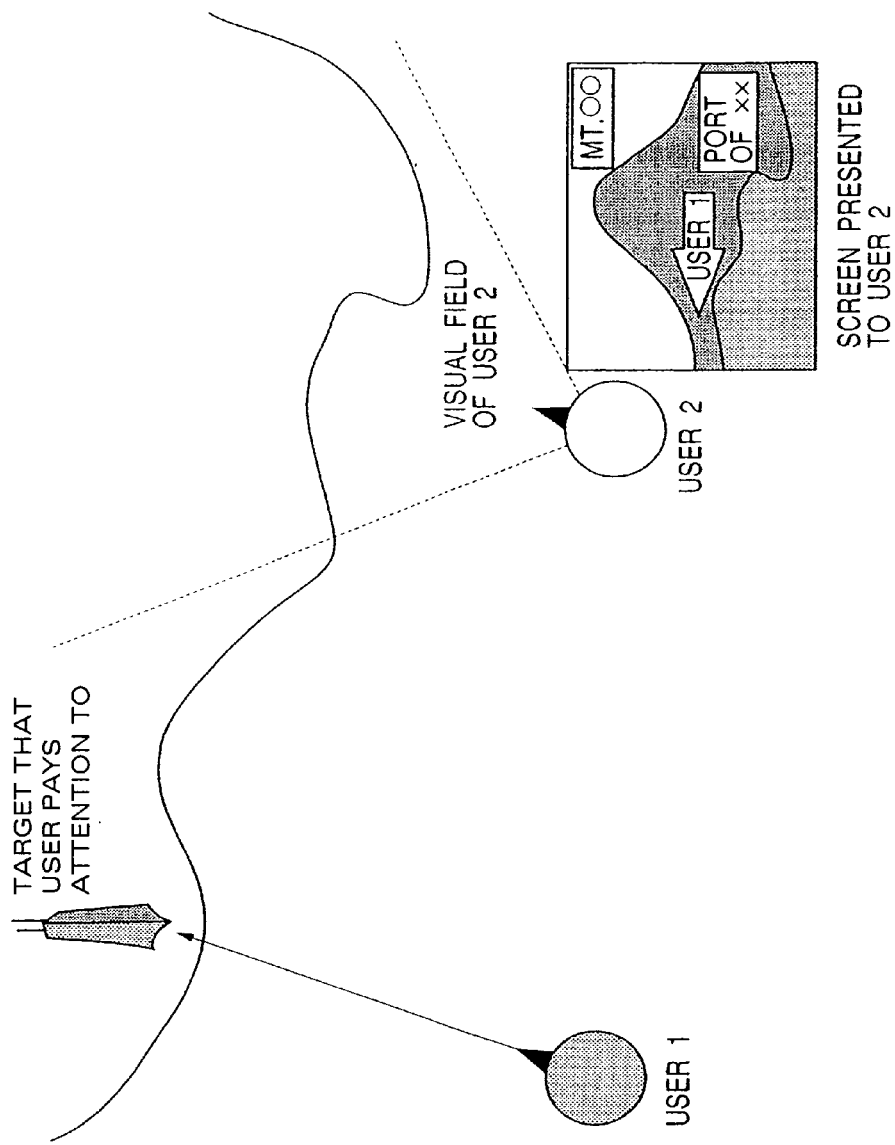
FIG. 4 is a diagram for explaining a means which, in a case where a target to which a watching user is paying attention is outside a visual range of a watched user, informs the watched user of the position of the target, according to that embodiment.

FIG. 4 shows a situation that, in a case where a user 1 who is the watching user observes a certain building and the building is outside the visual range of a user 2 who is the watched user, the arrow indicating the direction of the building and the annotation indicating the name of the user 1 are generated and displayed on the screen to be presented to the user 2.

Figure 5:
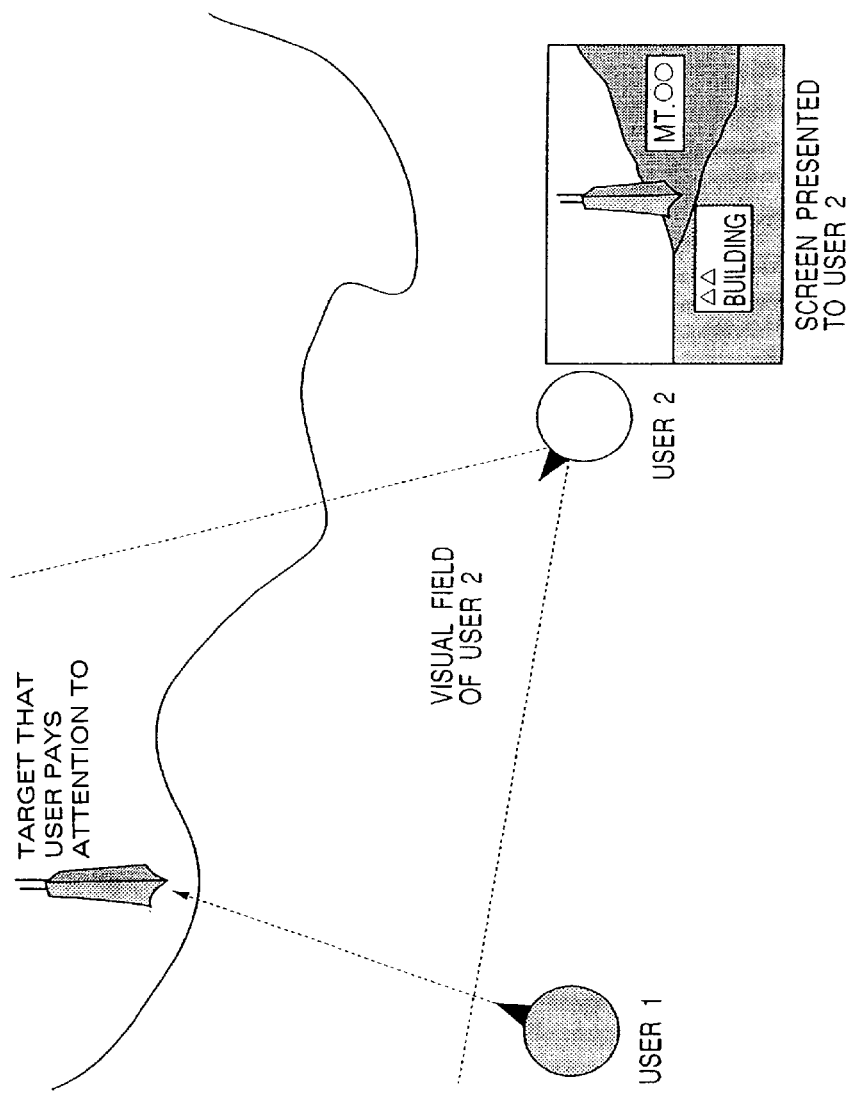
FIG. 5 is a diagram for explaining a means which, in a case where the target to which the watching user is paying attention is inside the visual range of the watched user, informs the watched user of the target and information concerning the target, according to that embodiment.

FIG. 5 shows a situation in which, in a case where the user 1 who is the watching user is paying attention to the certain building and the building is inside the visual range of the user 2 who is the watched user, the annotation (black background and white text) indicating the name of the building is generated and displayed on the screen to be presented to the user 2. In this situation, the attributes (black background and white text) of the generated annotation are made different from the attributes (white background and black text) of another annotation, so as to make the generated annotation remarkable.

In the information presentation apparatus 100 which is used by the watching user, in a case of generating the annotation of the information concerning the attention target, the attributes (color, shape, character type, etc.) of the annotation to be generated are made different from those of other annotations so as to make the annotation currently being generated remarkable, that is, to make it easy to distinguish. Moreover, the annotation of the information indicating whether or not the attention target is being observed by the watched user is generated and is presented to the watching user.

Figure 6:
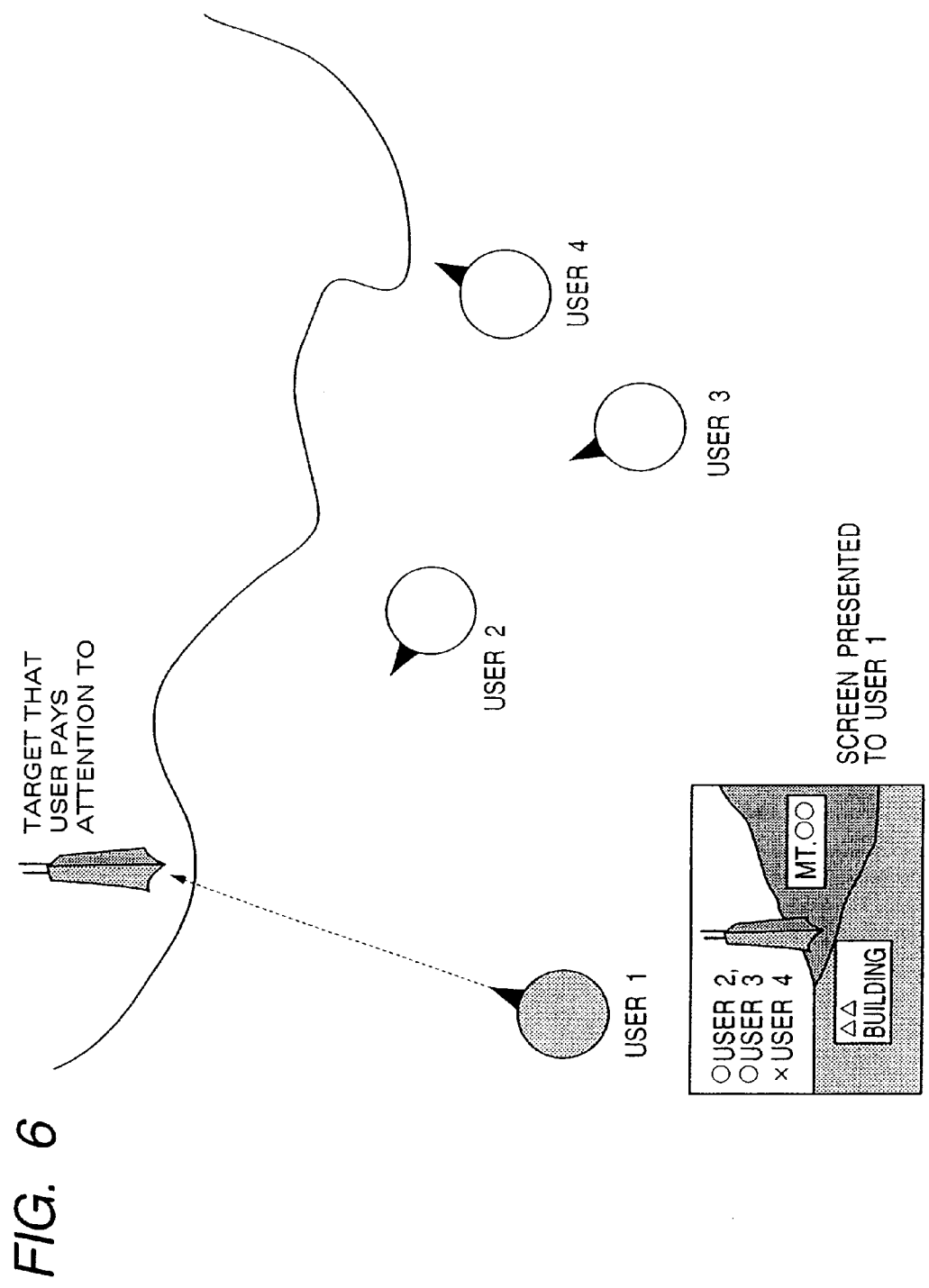
FIG. 6 is a diagram for explaining a means which presents to the watching user whether or not the target to which the watching user is paying attention is inside the visual range of each watched user, according to that embodiment.

FIG. 6 shows a situation that the user 1 who is the watching user is paying attention to the certain building, and the annotation (black background and white text) indicating the name of the building is generated and is made to have the attributes different from those of other annotations so as to make the generated annotation remarkable. Moreover, FIG. 6 shows a situation in which the annotation of the information indicating whether or not the watched users are paying attention to the building is generated and displayed.

Moreover, in the information presentation apparatus 100 of each user, in a case where another user exists inside the visual range of the user in the real world, the annotation indicating the name capable of discriminating that (other) user is generated. On the contrary, in a case where another user does not exist inside the visual range of the user in the real world, the annotation including the arrow indicating the direction of each user and the name capable of discriminating that user is generated.

Figure 7:
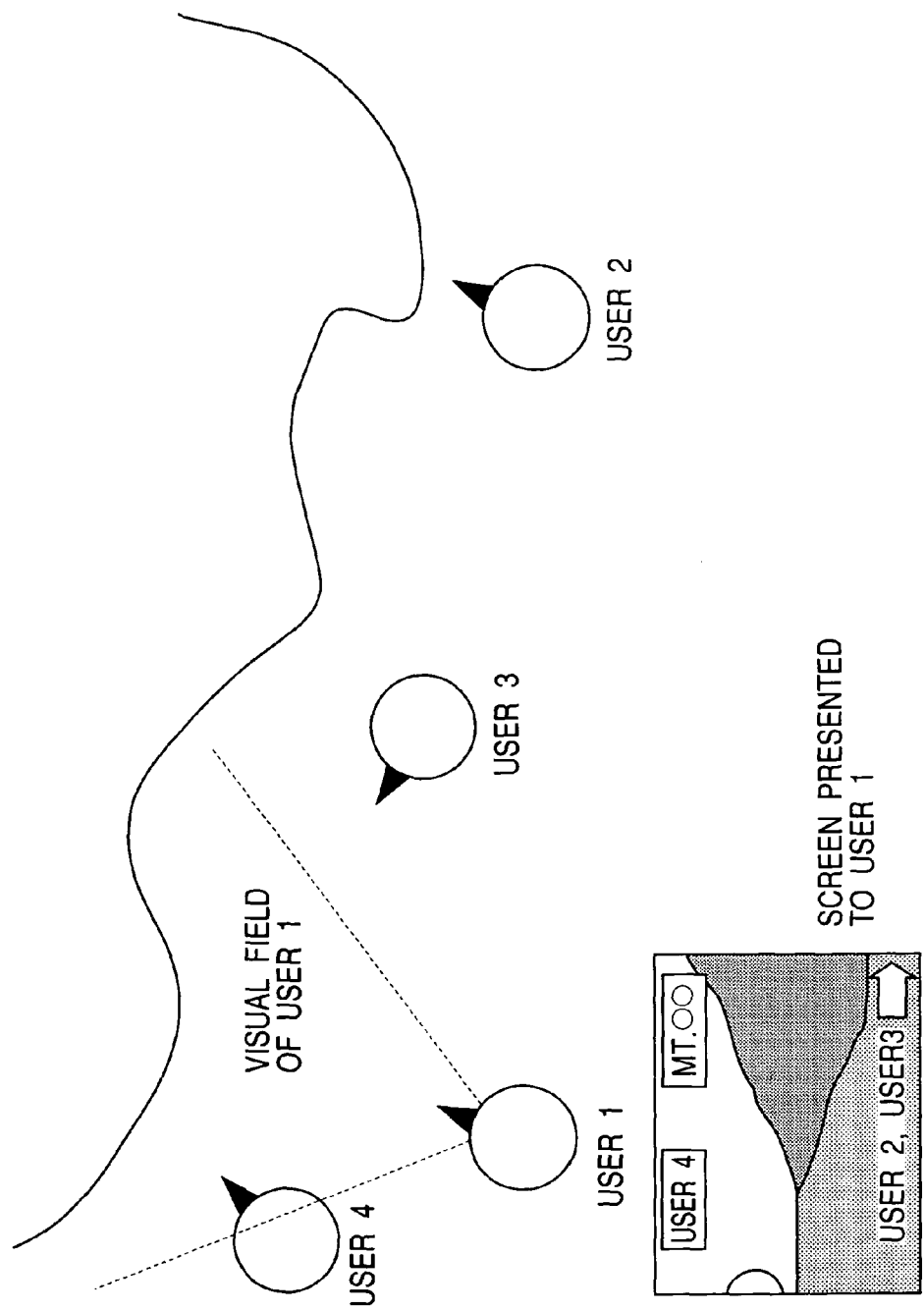
FIG. 7 is a diagram for explaining a means which presents to a user positions where other users exit, according to that embodiment.

FIG. 7 shows a situation that the annotation indicating the position of a user 4 existing inside the visual range of the user 1 is generated and displayed on the image screen of the user 1, and the annotation including the arrow indicating the direction of the users 2 and 3 existing outside the visual range of the user 1 and the names capable of discriminating these users is generated and displayed on the image screen of the user 1.

In the step S600, the communication data is transferred from the virtual image generation unit 105 to the transmission channel 200. For example, the communication data includes the identification number information of each user using the information presentation apparatus 100, the name information capable of discriminating each user, the position and pose information of each user's viewpoint, the operation information of each user, the annotation data and the like.

In a step S700, in accordance with the model data stored in the model data storage unit 103, the user's viewpoint is set based on the position and pose information at the user's viewpoint obtained in the step S200, and the virtual world which can be viewed from that viewpoint is drawn. Moreover, the annotation determined in the step S600 is superimposed and drawn on the image of the virtual world.

In the step S700, the image of the real world viewed from the user's viewpoint position and obtained in the step S200 may be first drawn as the background, and the virtual world and the annotation may be then superimposed and drawn on the background. At that time, in step S800, a process of only outputting the image obtained as the result of the drawing to the image display device.

In the step S800, the image of the real world viewed from the user's viewpoint position and obtained in the step S200 and the image of the virtual world generated in the step S700 are synthesized, and then the synthesized image is drawn and output to the image display device. Here, in the case where the image display device of the image display unit 107 is equipped with the optical see-through HMD, the image of the virtual world is drawn and output to the image display device.

In step S900, it is judged whether or not to end the operation of the information presentation apparatus 100. When it is judged not to end the operation, then the flow returns to step S100, while when it is judged to end the operation, the process ends as a whole.

According to the present embodiment, it is possible to notify another user of the target to which one user wishes to cause the other user to pay attention, it is possible for the user to know the position and the direction of the target in question, and it is further possible to know whether or not the target to which one user is paying attention at present is observed by other user. Therefore, it is easy to work in conferences, lectures, collaborative work or the like in which it is necessary for the single mixed reality space to be shared with the plural persons.

Other Embodiment

The object of the present invention can also be achieved in a case where a storage medium (or a recording medium) storing therein program codes of software to realize the functions of the above embodiment is supplied to a system or an apparatus, and thus a computer (or CPU, MPU) in the system or the apparatus reads and executes the program codes stored in the storage medium. In this case, the program codes themselves read from the storage medium realize the functions of the above embodiment, whereby the storage medium storing these program codes constitutes the present invention. Moreover, it is needless to say that the present invention includes not only a case where the functions of the above embodiment are realized by executing the program codes read by the computer, but also a case where an operating system (OS) or the like running on the computer performs a part or all of the actual processes on the basis of instructions of the program codes and thus the functions of the above embodiment are realized by such processes.

Moreover, it is needless to say that the present invention also includes a case where, after the program codes read from the storage medium are written into a function expansion card inserted in the computer or a memory in a function expansion unit connected to the computer, a CPU or the like provided in the function expansion card or the function expansion unit performs a part or all of the actual processes on the basis of the instructions of the program codes, and thus the functions of the above embodiments are realized by such processes.

As many apparently widely different embodiments of the present invention can be made without departing from the spirit and scope thereof, it is to be understood that the present invention is not limited to the specific embodiments thereof expect as defined in the appended claims.

The invention claimed is:

1. An information presentation apparatus comprising:
 user operation input unit, adapted to input an operation of a user;
 user viewpoint position and orientation measurement unit, adapted to measure a position and orientation of a user's viewpoint;
 model data storage unit, adapted to store virtual world model data, real world model data, and data necessary to generate a virtual world image;
 annotation data storage unit, adapted to store data necessary to be added to a real world and a virtual world and then displayed;
 virtual image generation unit, adapted to generate an image of the virtual world by using information in said user viewpoint position and orientation measurement unit, said model data storage unit and said annotation data storage unit;

user viewpoint image input unit, adapted to capture an image of the real world viewed from the user's viewpoint; and image display unit, adapted to display an image obtained by synthesizing the image generated by said virtual image generation unit and the image obtained by said user viewpoint image input unit, on an image display device of the user, wherein said virtual image generation unit draws the information stored in said model data storage unit from the user's viewpoint in computer graphics to generate the image of the virtual world viewed from the user's viewpoint, by using the position and orientation information at the user's viewpoint obtained from said user viewpoint position and orientation measurement unit, and wherein said virtual image generation unit has a function to generate an annotation indicating information of a target that the user pays attention to, such that its attributes of a color, a shape and a character type are different from those of other annotation.

2. An information processing method comprising the steps of:

inputting viewpoint information of a user;

generating a virtual world image according to the viewpoint information, by using previously held virtual world data;

generating an annotation concerning an attention target; and generating an image obtained by synthesizing an image of a real world, the generated virtual world image, and the generated annotation, wherein another annotation indicating whether or not the attention target is being observed by another user is generated and merged to the synthesized image, and wherein said virtual image generation unit has a function to generate an annotation indicating information of a target that the user pays attention to, such that its attributes are different from those of other annotation.

* * * * *

UNITED STATES PATENT AND TRADEMARK OFFICE
CERTIFICATE OF CORRECTION

PATENT NO. : 7,053,916 B2 Page 1 of 1
APPLICATION NO. : 10/626590
DATED : May 30, 2006
INVENTOR(S) : Toshihiro Kobayashi et al.

It is certified that error appears in the above-identified patent and that said Letters Patent is hereby corrected as shown below:

COLUMN 10:

Line 49, "expect" should read --except--.

COLUMN 11:

Line 20, claim 1, "annotation." should read --annotations,--.

COLUMN 12:

Line 18, claim 2, "annotation." should read --annotations,--.

Signed and Sealed this

Twentieth Day of November, 2007

JON W. DUDAS
*Director of the United States Patent and Trademark Office*